US008095590B1

(12) United States Patent
Holm et al.

(10) Patent No.: US 8,095,590 B1
(45) Date of Patent: Jan. 10, 2012

(54) TECHNIQUES FOR DISTRIBUTING DATA

(75) Inventors: Vernon Roger Holm, Sandy, UT (US); Ravikanth Dronamraju, San Jose, CA (US); Jamshid Mahdavi, San Jose, CA (US)

(73) Assignee: Novell, Inc., Provo, UT (US)

( * ) Notice: Subject to any disclaimer, the term of this patent is extended or adjusted under 35 U.S.C. 154(b) by 1534 days.

(21) Appl. No.: 10/899,876

(22) Filed: Jul. 27, 2004

(51) Int. Cl.
*G06F 15/16* (2006.01)

(52) U.S. Cl. ........................................ 709/201

(58) Field of Classification Search ............... 709/201
See application file for complete search history.

(56) References Cited

U.S. PATENT DOCUMENTS

| | | | |
|---|---|---|---|
| 5,515,502 A | 5/1996 | Wood | 395/182.13 |
| 5,671,350 A | 9/1997 | Wood | 395/182.13 |
| 5,724,500 A * | 3/1998 | Shinmura et al. | 714/6.3 |
| 5,950,198 A | 9/1999 | Falls et al. | 707/8 |
| 6,360,330 B1 | 3/2002 | Mutalik et al. | 714/4 |
| 6,591,306 B1 * | 7/2003 | Redlich | 709/245 |
| 6,611,923 B1 | 8/2003 | Mutalik et al. | 714/4 |
| 6,671,688 B1 | 12/2003 | Nikols et al. | 707/10 |
| 6,721,766 B1 | 4/2004 | Gill et al. | 707/204 |
| 7,020,697 B1 * | 3/2006 | Goodman et al. | 709/223 |

OTHER PUBLICATIONS

"Syncsort's Backup Express", http://www.syncsort.com/bex/infobex.htm, 2 pgs, Jun. 24, 2004.
"Syncsort's Backup Express Architecture", http://www.syncsort.com/bex/architecture.htm, 2 pgs, Jun. 24, 2004.

* cited by examiner

*Primary Examiner* — John Follansbee
*Assistant Examiner* — Maceeh Anwari
(74) *Attorney, Agent, or Firm* — Schwegman, Lundberg & Woessner, P.A.

(57) ABSTRACT

Techniques are provided for distributing data over a network. One or more source nodes distribute data to an intermediate node. The intermediate node accumulates the data, dynamically selects a first path for distributing the data to a first destination node, and dynamically selects a second path for distributing the data to a second destination node. In an embodiment, the data is simultaneously distributed over the first and second paths from the intermediate node.

12 Claims, 5 Drawing Sheets

TECHNIQUES FOR DISTRIBUTING DATA

FIELD OF THE INVENTION

The invention relates generally to networking and more specifically to techniques for distributing data across a network.

BACKGROUND OF THE INVENTION

Distributing large amounts of data across a geographically disperse Wide Area Network (WAN) has become commonplace in today's economy. Organizations may have systems and networks that span across the entire globe. Moreover, organizations and governments are increasing capturing and analyzing more and more data within their systems.

One system may require data from another system that is located in a distant geographical location. Further, one or more systems may be redundant and thus configured to stay in synch with one another. Systems may also be backed up to other systems.

One problem associated with distributing large amounts of data across a WAN or for that matter any network (e.g., Local Area Network (LAN), Metropolitan Area Network (MAN), etc.) is that network nodes, connections, routers, hubs, and the like have limited amounts of bandwidth. Also, the network resources may be concurrently processing a variety of other network transactions.

To address this problem, the networking industry has taken a variety of approaches or combination of approaches. One technique is referred to as Quality of Service (QoS) where software and hardware cooperate to prioritize network bandwidth and transactions and re-distribute or pre-allocate resources based on priorities and known resource limitations. Another approach is to reserve a certain amount of dedicated resources to handle certain transactions. These dedicated resources may always be available for certain transactions or consistently available on certain times or calendar days.

Although in certain circumstances these approaches are valuable, they kill have not provided a solution for adequately distributing large amounts of data across a network. This is so because data backups and replication still largely rely on direct connections to perform backups or replication. That is, direct routes are established within a network for distributing data during a backup or replication from a source node to a destination node. As a result, any intermediate node along a path of a direct connection in route to a destination node has little to no control over where the data is to be sent next within the route, since the route is largely static. The intermediate nodes are not intelligent and not flexible and therefore cannot adjust the distribution of the data in ways that may be more efficient.

Also, because conventional data backup and replication primarily implement direct connections with static routes, there is little opportunity to aggregate the data at intermediate locations within the route from the source node to the destination node. Aggregation has a variety of benefits, such as multicasting data to a plurality of destination nodes, recovery should a destination node or connection fail during a backup or replication operation which does not need to be addressed by the source node, etc.

Furthermore, it becomes challenging to implement network-wide QoS techniques during conventional backups or replications because each node within the network may be independently accessing the destination node with a variety of other network transactions. It is difficult, because the intermediate nodes have virtually no control over how and when the data is distributed along to the destination node. Thus, with existing data backup and replication techniques even if the intermediate node is capable of performing QoS operations, that intermediate node cannot effectively deploy QoS features for the backup or replication.

Therefore, there is a need for improved data distribution techniques, which may be particularly useful for data backup and data replication operations over a network.

SUMMARY OF THE INVENTION

In various embodiments of the invention, techniques are presented for distributing data over a network. Data from one or more source nodes are accumulated at an intermediate node, from the intermediate node the data is distributed to at least two destination nodes. The intermediate node dynamically selects paths for moving the data to the destination nodes. In an embodiment, the data is simultaneously distributed over the paths to the destination nodes.

More specifically, and in an embodiment, a method for distributing data is presented. Data is negotiated for transfer from one or more source nodes to a first destination node and a second destination node. Data portions are accumulated and simultaneously distributed over a first path to the first destination node and over a second path to the second destination node.

DETAILED DESCRIPTION OF THE INVENTION

In various embodiments of the invention, the term "node" is used. A node may be any network resource or processing device, such as a client, a server, a proxy, a mass storage device, etc. Nodes are connected via a network and interface with one another using a variety of protocols or interfaces, some interfaces are associated with hardware and some are associated with software. The interfaces may be layered, meaning that higher-level interfaces are used by applications or users interfacing on the nodes and are converted into a variety of other lower-level interfaces for purposes of performing a network transaction.

Further, each node may be interfaced to a variety of other processing devices and other LANs. The processing devices execute applications and a number of related applications cooperate to form systems. Any particular node can be designated as a source node, an intermediate node, or a destination within the network. A source node initiates a network transaction from one of its applications or system executing on one of its processing devices. An intermediate node assists in relaying or forwarding a source node's transaction through the network to a destination node. Any particular network transaction may be handled by a multitude of intermediate nodes before it reaches its destination node. A destination node has the processing device, application, system, or storage medium that is the object of the source node's transaction.

The designation of a node within a network as a source, intermediate, or destination node is relative. This means that one node may receive a designation for one transaction and a different designation for another transaction. Typically, a node that initiates a network transaction will drive designations for the other participating nodes that will handle the transaction.

During a transaction over a network, the paths that the transaction may take can be viewed as a sub-network for that transaction. A path is a subset of nodes, connections, and/or resources that define how the transaction may move from the source node through zero or more intermediate nodes to the destination node. The sub-network can be logically viewed as a tree from the source to the destination. The tree may have one or more paths which can successfully reach the destination node. In one embodiment, the tree is initially generated at the source node before the transaction is propagated through the network to the destination node. In another embodiment, the tree is generated by an outside service (external to a source node) on behalf of a single source node or multiple source nodes.

In various embodiments of the invention, the tree may be dynamically propagated though the network to processing nodes for a transaction as those propagating nodes initially receive a first packet of data associated with a distribution of data. That is, a transaction may be moving large chunks of data such that in order to successfully process the transaction through the network, the source node breaks the data up into a series of data packets (data portions) and the transaction becomes a series of sub-transactions that send the data packets until all packets are sent. Each intermediate node involved in a transaction can process the tree in manners that it views most efficient or in manners that it is instructed, and that instruction may be automatic via application control logic or via manual network administrator initiated overrides.

In one embodiment, the techniques presented herein are incorporated into network arrangements and products, such as products that may perform data backup or data replication. These techniques optimally distribute data through a network in the manners described herein and below.

Figure 1:
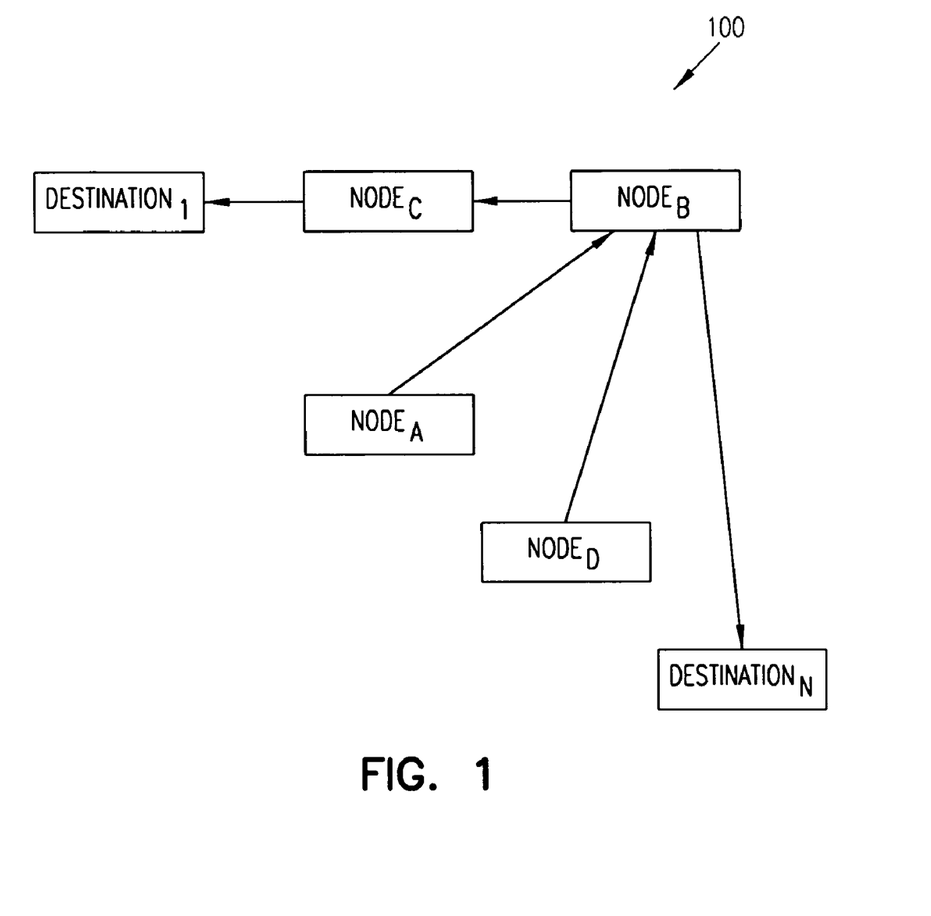
FIG. 1 is a diagram of an example distribution of data through a network, according to an example embodiment of the invention.

FIG. 1 is a diagram 100 of an example distribution of data through a network, according to an example embodiment of the invention. The diagram 100 is presented for purposes of illustration only and provides an example flow of data through a network which may occur with the teachings presented herein. Therefore, the diagram should not be viewed as a limitation on the invention, since other examples and arrangements are conceived and intended to fall within the generous scope of this invention.

The diagram 100 illustrates a snapshot of a few participating nodes in a network transaction that distributes data through a network. Here, two nodes are participating as source nodes (nodes A and D) in a network transaction to backup or replicate data from nodes A and D to two destination nodes (destination 1 and destination N). Initially, source nodes A and D either generate the transaction request themselves or are instructed to generate the transaction by another node.

Nodes A and D generate a tree for the transaction, that tree identifies the remaining nodes (nodes B, C, destination 1 and destination 2). Although not depicted in the diagram, the tree may also include a variety of other nodes that may have participated in the transaction as portions of alternative paths from the source nodes to the destination nodes, but these missing nodes were eliminated as choices by node B at some point during processing the transaction. Again, the tree itself may be generated by a service local to the source nodes or by a service in communication with the source nodes but external to the source nodes.

The tree includes success factors for various paths or nodes of the tree. In one embodiment, the success factor may be viewed as a probability value of 0-1. The tree, along with its metadata that includes the success factors, is initially communicated from source nodes A and D when the data distribution transaction begins.

Node B is a novel intermediate node, in that it serves as an aggregating node for the data distribution and may dynamically use the tree and its metadata to decide dynamically which path to use to move the data from A and D to destination 1 and destination 2. Data is being incasted from A and D to B. B determines that it can distribute the data to destination 2 directly and to destination 1 through yet another intermediate node C.

In one example implementation, Node B aggregates data from A and different data from E, once the data is completely received, B decides how it may optimally distribute that aggregated data to both destination nodes 1 and 2. This may be done by evaluating the tree, evaluating QoS conditions (priorities, node processing loads, etc.), time conditions, calendar day conditions, and the like. The transaction associated with distributing the data as a backup or replication is not entirely controlled by the source nodes A and D and is not occurring via a direct connection or static network path, as has conventionally been the case.

Intermediate node B can be viewed as an incast or aggregating node, which can utilize its own custom applications, QoS features, and the like to decide how to optimally distribute the aggregated data from A and D to destinations 1 and 2. In one embodiment, node B may multicast or simultaneously send the aggregated data over its two separate connections associated with reaching node C (for destination node 1) and reaching destination node 2. Again, FIG. 1 is presented for purposes of illustration only, since any particular node, such as destination node 2 may in fact be N nodes, where N is an integer beginning at 1. Thus, any particular node in FIG. 1 may actually be a particular node within a set of nodes or a single node.

In some embodiments, node B includes interfaces which may permit a network administrator to view the various network conditions, bandwidth utilizations, tree, and node B's preliminary determinations as to how and when the aggregated data will be distributed to destinations nodes 1 and 2. The interfaces may be used by the administrator to override node B's preliminary determinations. This gives tremendous flexibility and control to network administrators that have previously not been possible with conventional backup and replication transactions.

It should also be noted, that node B may elect to send only pre-defined portions of the aggregated data to destination node 1 and other pre-defined portions of the aggregated data to destination node 2. Furthermore, there may be a plurality of additional source nodes participating and destination nodes participating in a transaction. Additionally, node C may be used as an incast node similar to node B and may perform similar operations as is performed by B, in this case node B may be designated as a source node from the perspective of node C. In fact a variety of arrangements are possible. The point is that the novel aggregating node B and its control over the data distribution permits tremendous flexibility in distributing data, which has conventionally been very static and limited when data backups or replications were being processed.

Figure 2:
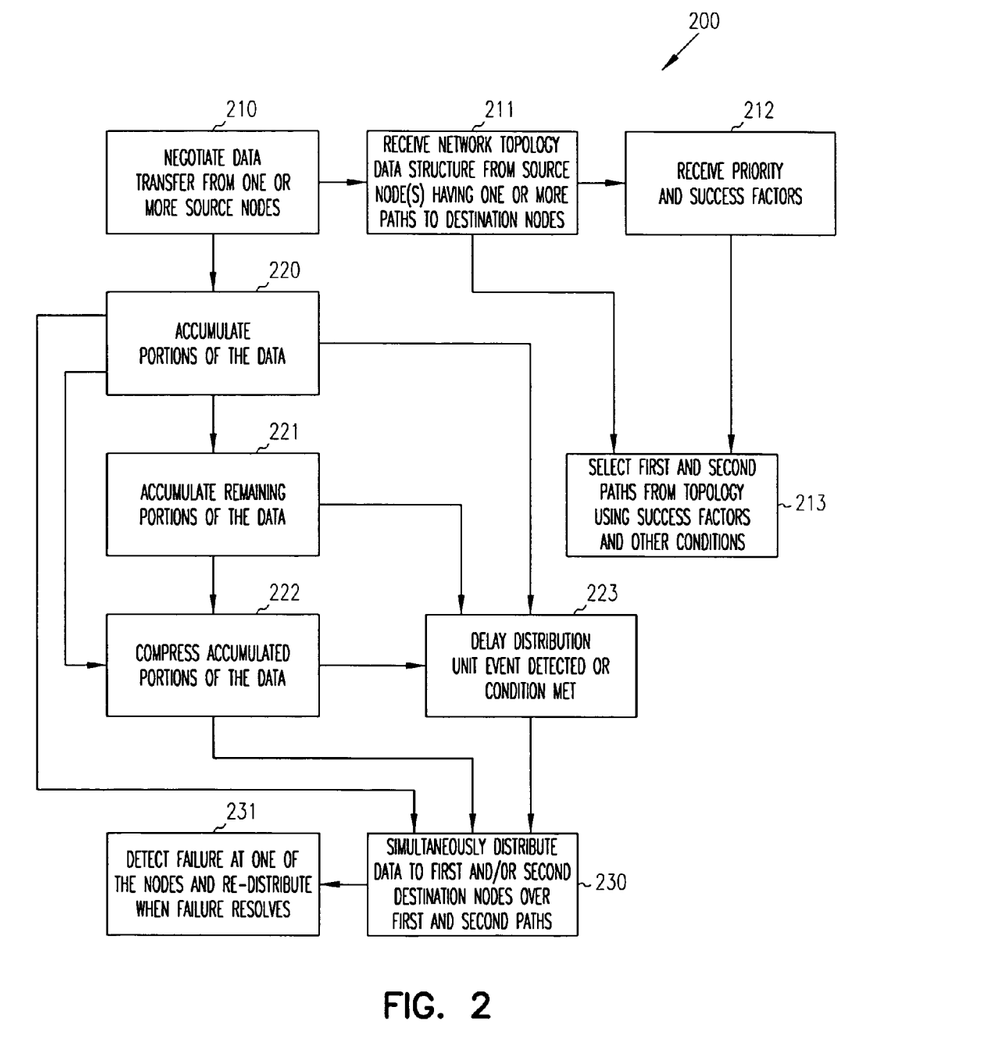
FIG. 2 is a flowchart of a method for distributing data, according to an example embodiment of the invention.

FIG. 2 illustrates one method 200 for distributing data over a network. The method is implemented in a machine-accessible or readable medium and is accessible over the network. In one embodiment, the method 200 (herein after "processing") is implemented as a data manager application or system that may be installed and executed on any node within the network. The processing executes its features presented below when the node on which it is processing is designated an intermediate node during a particular network transaction. Moreover, in one embodiment, the transaction is a data backup or data replication operation associated with distributing data from one or more sources nodes to one or more destination nodes.

Initially, the processing detects within its environment and processing device (node) that it is being asked to participate in a transaction to distribute data from one or more source nodes to one or more destination nodes. This triggers the processing depicted in FIG. 2. Accordingly, at 210, the processing negotiates data transfer from the one or more source nodes to at least a first destination node and a second destination node. During negotiating, the source nodes and the processing agree on protocol communications, bandwidth limits, priorities, etc. for the data transfer.

In one embodiment, at 211, during negotiation the one or more source nodes also provide the processing with a network topology data structure (e.g., tree). The one or more source nodes may have their own services for generating the network topology data structure or may acquire it from an external service that is external to the one or more source nodes. The data structure includes one or more paths for distributing the data to each of the first and second destination nodes or a particular one of the destination nodes. The data structure may also include other metadata such as success factors associated with nodes or the one or more paths, success factors for each of the paths, success factors for connections within the paths, and the like.

Thus, at 212, the processing may also receive the success factors and/or a priority from the metadata associated with the data structure. The processing may use the priority and the success factors in combination with conditions of the network, the destination nodes, the nodes of the paths, the connections, QoS conditions, and other dynamically detected events to, at 213, dynamically select a first path for distributing the data to the first destination node and/or a second path for distributing the data to the second destination node.

In some embodiments, the processing may also receive manual overrides from a network administrator interfaced to the processing. The manual overrides may alter decisions made by the processing as to the selected first and second paths. Additionally, the manual overrides may alter conditions or raise events during the processing which alter the decisions as to when and in what manner the processing distributes the data to the first and/or second destination nodes.

After negotiation, at 210, the processing receives a series of data packets representing portions of the data from the one or more source nodes. At 220, these portions of data are accumulated within the local environment of the processing. In some embodiments, at 221, the processing aggregates the remaining portions of the data from the one or more source nodes until a complete version of the data is acquired within the local environment of the processing. This complete version may be compressed at 222 for purposes of storage efficiency and/or for purposes of transmission efficiency to the first and/or second destinations nodes. In another embodiment, the processing buffers a configurable amount of the data and once that amount is acquired, the processing may begin to distribute the data to the first and/or second destination nodes.

In still other embodiments, at 223, the processing may delay distribution of the data until a configured event is detected or until a condition is met. The events and conditions may be configured within the processing, may be part of the metadata associated with the network topology data structure, or may be manually provided by a network administrator. An event may be raised by other applications executing within the environment of the processing or executing on other nodes of the network. A condition is something dynamically evaluated by the processing itself, such as predefined time of day, calendar day, acknowledgment that a destination node is ready, etc.

At 230, the processing simultaneously distributes the data to the first and/or second destination nodes over the first and second paths, respectively. In one embodiment one or more of the paths may actually be a direct connection to one of the destination nodes; thus, the paths under these circumstances are single connections to single nodes, which are the destination node(s). In other embodiments, the paths may include one or more intermediate nodes interjected in between the destination node(s), and each of these intermediate nodes may be executing instances of the processing depicted in FIG. 2. The data may be simultaneously distributed using multicasting techniques and protocols.

Additionally the accumulated data does not have to be identically distributed to the first and second destination nodes, in cases where two or more destination nodes are receiving portions of the accumulated data. That is, the processing can be configured, dynamically instructed, or manually instructed to send one portion of the accumulated data to the first destination node and a different portion to the second destination node. However, in some embodiments, the accumulated data is identically distributed to the first and second destination nodes.

In one embodiment, at 231, the processing may detect a failure during part of the data distribution or before data distribution occurs over the first and second paths to the first and second destination nodes. A failure may occur over the connection associated with reaching a particular destination node, may occur with other intermediate nodes associated with a selected path of reaching the particular destination node, or may occur within the particular destination node itself. In these embodiments, the processing may be configured to re-distribute the data or portions of the data when it is satisfied or is notified that the detected failure is resolved.

Figure 3:
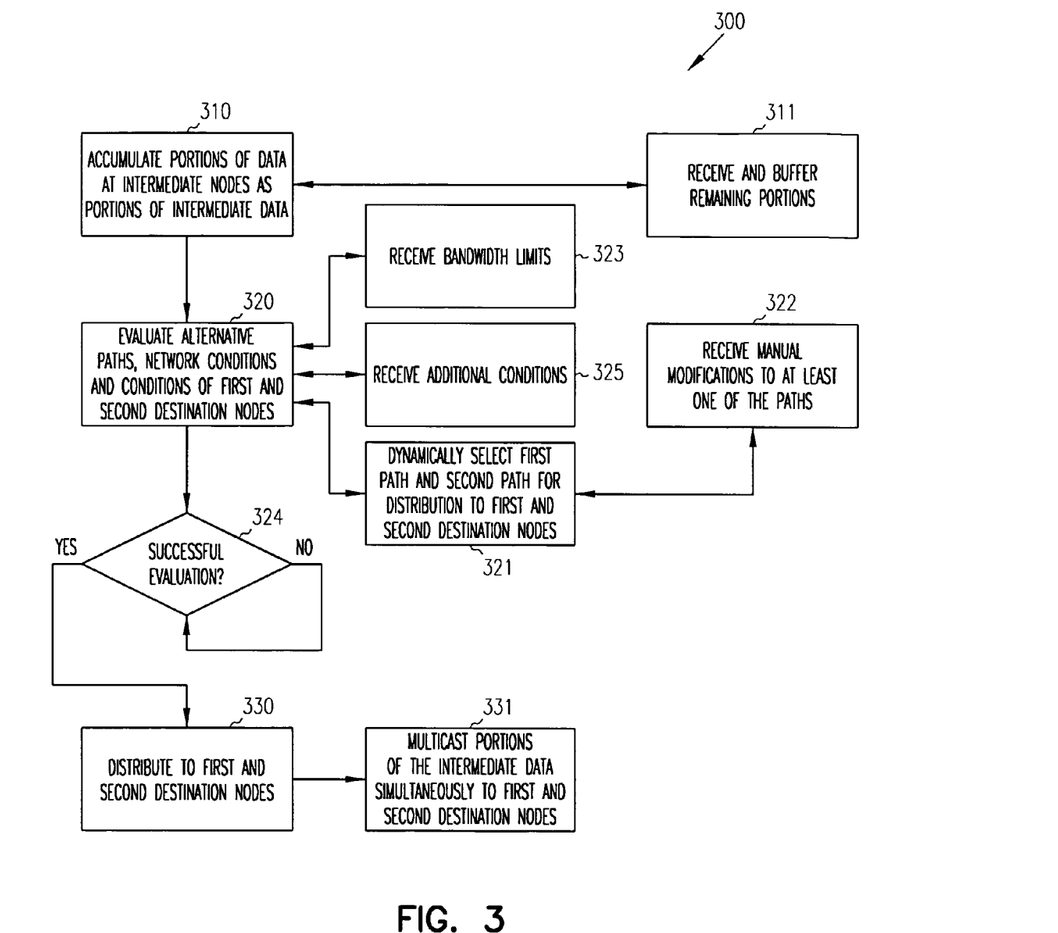
FIG. 3 is a flowchart of another method for distributing data, according to an example embodiment of the invention.

FIG. 3 is a flowchart of another method 300 for distributing data over a network. The method 300 is implemented in a machine-accessible or readable medium and is operational over a network. The method 300 performs processing on nodes of the network when the node on which the method 300 is executing is designated as an intermediate node for a network transaction associated with distributing data.

After one or more source nodes establish a transaction for distributing data, at 310, portions of that data are accumulated at an intermediate node of the network. The accumulated portions of the data are designated as portions of intermediate data. In some embodiments, at 311, the remaining portions of the data are accumulated until a complete version of the data is represented as a complete version of intermediate data. The remaining portions are buffered at the intermediate node.

At 320, conditions of the network, alternative paths, and conditions of first and second destination nodes and their connections are evaluated. Evaluation occurs to determine, at the intermediate node, an optimal manner for distributing the portions of the intermediate data to the first and second destination nodes. The alternative paths may be resolved through receipt of a network topology data structure (e.g., tree) in manners similar to what was discussed above with the method 200 of FIG. 2. Likewise, the conditions and events may be evaluated in manners similar to what was presented above with the method 200.

In one embodiment, at 321, a first path for distributing the intermediate portions of the data and a second path for distributing the intermediate portions of the data are dynamically selected during the evaluation based on the available alternative paths. In some instances, at 322, manual modifications or overrides may be received from a network administrator's interface which alters or changes one of the dynamically selected paths.

In yet more embodiments, at 323, bandwidth limits or desired bandwidth availability for performing the data distribution are received and consumed during the evaluation. A bandwidth's constraint may be received from the one or more source nodes or from network administer provided parameters. The constraint is adhered to during the data distribution. Each destination node may have its own unique constraint. Conversely, a single constraint can be jointly associated with the combined data distribution associated with reaching both destination nodes.

At 324, a check is continuously and dynamically made to determine if a successful evaluation has been achieved or detected. Thus, if no successful evaluation is achieved, the evaluation continues until one is achieved, or until a time out occurs, or another configurable event is detected that terminates the data distribution resulting in an error condition. That error condition may be logged and/or dynamically communicated to one or more other applications, systems, or resources.

If a successful evaluation is achieved, at 324, then, at, 330, the portions of the intermediate data are distributed to the first and second destination nodes. Distribution can occur in a variety of configurable manners. For instance, some portions of the intermediate data may be distributed to the first destination node while other different portions of the intermediate data may be distributed to the second destination node.

Additionally, distribution to each of the destination nodes may occur at different times. For example, configurable conditions may be met and a successful evaluation achieved for the first destination node such that the portions of the intermediate data may be distributed to it while conditions are not met at that particular time for distributing the portions of the intermediate data to the second destination node. It may also be that one of the paths for reaching one of the destination nodes is experiencing a failure, such that the portions of the intermediate data is properly distributed to the destination node that is not currently experiencing a failure. It may also be that a manual override indicated that data is not to be distributed to one of the destination nodes.

In other embodiments, at 331, the intermediate portions of the data are multicast simultaneously to both the first and second destination nodes over two separate paths. This advantageously utilizes network resources efficiently and also more timely delivers the portions of the intermediate data to both of the destination nodes. Additionally, in instances where the data distribution is associated with a data replication this operation timely and in real time keeps the first and second destination nodes in synchronization with one another.

Figure 4:
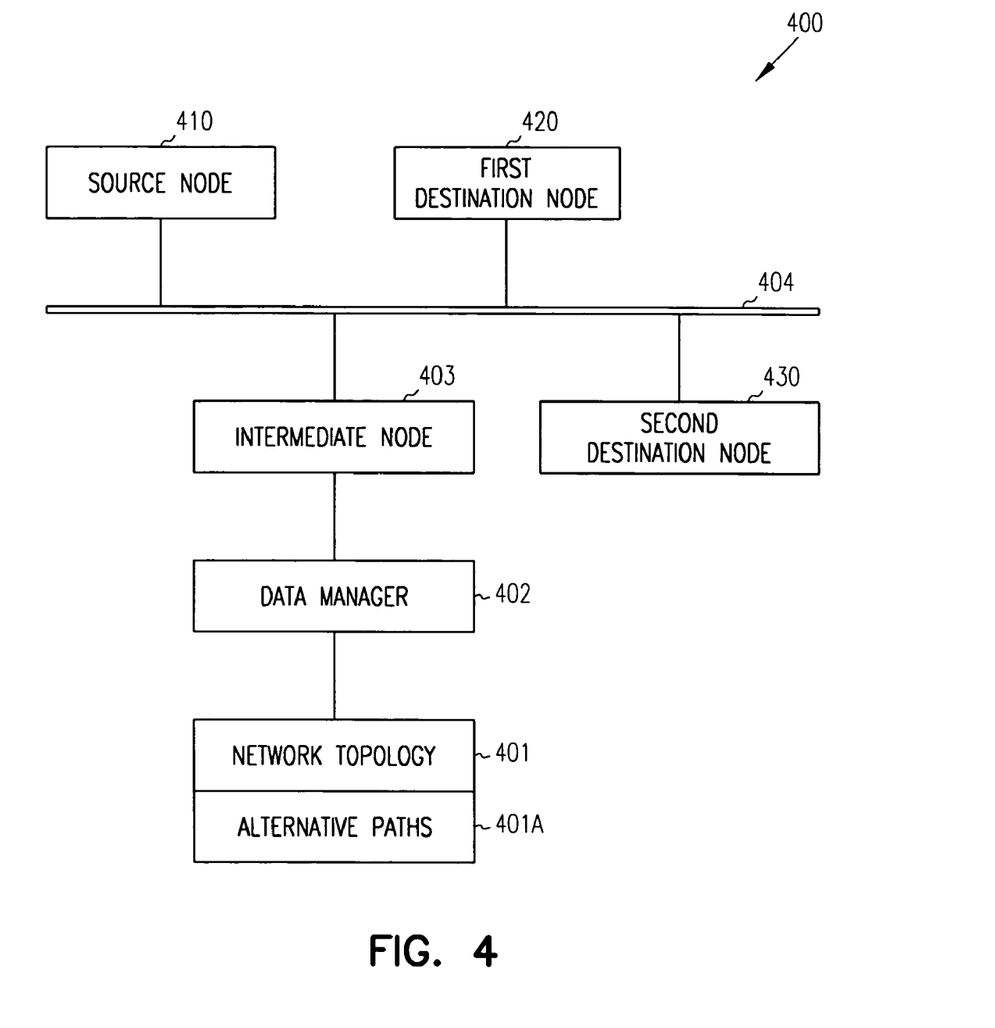
FIG. 4 is a diagram of a data distribution system, according to an example embodiment of the invention.

FIG. 4 illustrates a diagram of a data distribution system 400. The data distribution system 400 is implemented in a machine-accessible or readable medium and is operational over a network. In one embodiment, the data distribution system 400 implements the techniques of methods 200 and 300.

The data distribution system 400 includes a network topology data structure 401 and a data manager 402. The data structure 401 is similar to a tree although it may be any custom data (e.g., object, etc.) structure or known data structure (e.g., list, table, queue, etc.). Moreover, the data structure 401 is similar to what was discussed above with respect to method 200 of FIG. 2. The data structure 401 is received by the data manager 402 at an intermediate node 403 from a source node 410 over a network 404.

One aspect of the data structure 401 is the inclusion of alternative paths 401A. These alternative paths 401A are nodes and connections identified by the source node 410 for distributing data from the intermediate node 403 to at least a first destination node 420 and a second destination node 430 over the network 404.

In one embodiment, the data structure 401 includes additional metadata or links to metadata, where that metadata identifies a variety of information that is consumed by the data manager 402. Some of that information may include success factors for the alternative paths 401A, similar to what was presented above with method 300 of FIG. 3. In some instances the information includes priorities, bandwidth limits, bandwidth requests, etc. The data structure 401 can be logically viewed as a sub-network within the network 404 for a particular data distribution transaction initiated by a source node 410.

The data manager 402 dynamically receives the data structure 401 during an initial negotiation with the source node 410 for processing a data distribution transaction. The source node 410 transmits portions of the data in packets to the intermediate node 403 during the life-cycle of the transaction. The data manger 402 processes on the intermediate node 403 or within the LAN of the intermediate node 403. Moreover, the data manager 402 batches and accumulates the data packets during the life-cycle of the transaction. If configurable conditions are met or the appropriate events detected, then the data manager 402 distributes the accumulated data to the first and second destination nodes 420 and 430 over the network 404 via first and second paths which are dynamically selected from the alternative paths 401A of the data structure 401.

The data manager 402 may delay distributing the data until it has batched a configurable amount of the data received via data packets from the source node 410. Alternatively, the data manager 402 may delay distributing the data until it has a complete collection or version of the data. Additionally, the data manager 402 may delay until configurable conditions are met or events detected.

Additionally, conditions, events, and data manager 402 determined first and second destination paths can be overridden by a network administrator through an interface to the data manager 402.

In one embodiment, the first and second destination nodes 420 and 430 are geographically dispersed from one another over the network 404 where the network is a WAN, such as the Internet. In some instances, the data distribution transaction is a data backup or data replication operations initiated from the source node 410.

It should be noted that the data manager 402 may be implemented and operational within each of the nodes depicted in FIG. 4. The data manager 402 wakes up and processes when that node, on which it is executing, is designated as an intermediate node 403 (for any given network data distribution transaction). Additionally, each node of FIG. 4 can receive a different designation (source, intermediate, or destination) based on its role for any given transaction.

Figure 5:
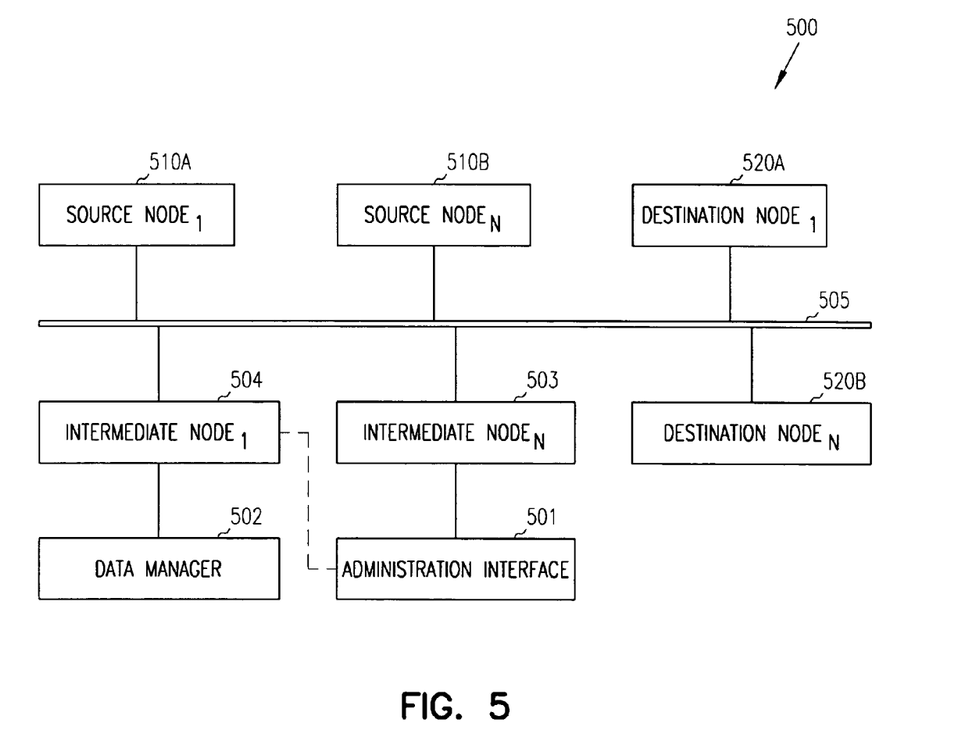
FIG. 5 is a diagram of another data distribution system, according to an example embodiment of the invention.

FIG. 5 depicts another data distribution system 500. The data distribution system 500 is implemented in a machine-accessible or readable medium and is accessible over a network. In one embodiment, the data distribution system 500 distributes data over the network for one or more source nodes to one or more destination nodes via one or more intermediate nodes. The arrangement and configuration of the components of FIG. 5 is presented for purposes of illustration only, since as has been described above the component (node) designations are relative and the entities (applications) of the components may be installed on each of the components.

The data distribution system 500 includes an administrator interface 501 and a data manager 502. The administrator interface 501 includes an Application Programming Interface (API) to the data manager 502. An administrator selects and processes various operations of commands of the API to check on the status of a data distribution transaction. Some features of the API may permit the administrator to visually inspect status of nodes and of the transaction. Other features of the API permits the administrator to alter processing associated with the transaction by interacting with the data manager 502, which is actively processing the transaction on an intermediate node 504. The administrator interface 501 may process on one or any of the nodes of the network 505, such as intermediate node 503.

The data manager 502 receives a data distribution transaction from one or more source nodes 510A and 510B over the network 505. In one embodiment, the network 505 is a WAN that includes nodes which are geographically dispersed from one another. The transaction directs the data manager 502 to distribute data received from the one or more source nodes 510A and 510B to one or more destination nodes 520A and 520B.

The data manager 502 receives guidance from the one or more source nodes 510A and 510B, such as through the network topology data structure 401A presented in FIG. 4. The data manager 502 is also free to independently alter that guidance based on configurable conditions and/or events. Additionally, the administrator interface 501 (via its API) is free to independently alter the guidance or the configurable conditions and/or events resolved by the data manager 502.

The data manager 502 may simultaneously distribute the data received from the one or more source nodes 510A and 510B over the network 505 to the one or more destination nodes 520A and 520B, such as through the use of multicasting techniques and/or protocols. Additionally, the data manager 502 may selectively distribute different portions of the data to the one or more destination nodes 520A and 520B and/or distribute the data at different times to the one or more destination nodes 520A and 520B. The data manager 502 may also be configured to detect failure conditions and take actions based on the same, such as re-distributing the data when the failure resolves.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method implemented in a machine-readable device for execution on a processing device for distributing data, the method comprising:

negotiating, by the processing device, a transfer of data from one or more source nodes to at least one of a first destination node and a second destination node, the processing device is an intermediate node along an initial path that the data is to transfer before reaching the first and second destination nodes, negotiation includes agreeing with the one or more source nodes on protocol communications, bandwidth limits, and priorities for the transfer of the data, the one or more source nodes initiate a network transaction to send the data through a network via the intermediate node to the first destination node and the second destination node, the intermediate node relays or forwards the data for the network transaction to the first destination node and the second destination node, and the first and second destination nodes are the object of the data being sent initially from the one or more source nodes over the network as the network transaction, the first and second destination nodes receive the data from the intermediate node; and further detecting, by the processing device, a failure at one of the destination nodes during distribution and re-distributing the data after the failure is resolved at the destination node that had failed;

receiving, at the intermediate node, a tree data structure having a first path to the first destination node and a second path to the second destination node, the tree data structure generated by the one or more source nodes for the network transaction and also includes success factors as probability values conducting the network transaction over the first path and the second path;

accumulating, at the intermediate node, portions of the data; and simultaneously distributing, from the intermediate node, portions of the accumulated data over the first path to the first destination node and over the second path to the second destination node, the first and second paths occur via separate network connections of the intermediate node and the first path and the second path determined from the tree data structure based on evaluation of the probability values and quality of service conditions resolved by the intermediate node, the evaluation also determines how the intermediate node delivers the portions of the accumulated data over the first path and the second path.

2. The method of claim 1, wherein negotiating further includes receiving a network topology data structure having one or more paths, and wherein the first and second paths are selected from the one or more paths based on at least one of conditions of a network and meta data associated with the network topology data structure, the network topology data structure is the tree data structure.

3. The method of claim 2, wherein receiving further includes identifying at least one of a priority for distributing the data and the success factors associated with each of the one or more paths, and wherein the success factors are resolved based on the quality of service conditions of the network.

4. The method of claim 1 further comprising, accumulating, by the processing device, remaining portions of the data before distributing the accumulated portions of the data to at least one of the first and second destination nodes.

5. The method of claim 1 further comprising, compressing, by the processing device, the accumulated portions of the data before distributing to at least one of the first and second destination nodes.

6. The method of claim 1, further comprising delaying, by the processing device, the distribution until an event is detected or a condition is met.

7. A method implemented in a machine-readable device for execution on a processing device for distributing data, the method comprising:

accumulating, by the processing device, portions of data at an intermediate node of a network as portions of intermediate data, the processing device is the intermediate node of the network and the data is being directed to first and second destination nodes from a source node and through an initial path that includes the intermediate node, the source node initiates a network transaction to send the data through a network via the intermediate node to the first destination node and the second destination node, the intermediate node is to relay and forward the data for the network transaction to the first destination node and the second destination node, and the first and second destination nodes are the object of the data being sent initially from the source node, the first and second destination nodes receives the data from the intermediate node; and further detecting, by the processing device, a failure at one of the destination nodes during distribution and re-distributing the data after the failure is resolved at the destination node that had failed;

evaluating, at the intermediate node, quality of service conditions of the network, alternate paths, and quality of service conditions of the first destination node and the second destination, the alternative paths resolved based on receipt of a network topology data structure that is a tree from which the alternative paths are derived, the tree also including success factors as probability values for success of distributing data for the initial path and the alternative paths, and tree generated by an external service to the source node and provided on behalf of the source node; and simultaneously distributing, from the intermediate node, over a first path to a first destination node and over a second path to the second destination node, portions of the intermediate data to the first and second destination nodes over separate network connections of the intermediate node over the first path and the second path determined from the tree data structure based on successful evaluation of the probability values and quality of service conditions resolved by the intermediate node, the evaluation also determines how the intermediate node delivers the portions of the accumulated data over the first path and the second path.

8. The method of claim 7, wherein evaluating further includes:

dynamically selecting a first alternative path for distributing the portions of the intermediate data to the first destination node; and dynamically selecting a second alternative path for distributing the portions of the intermediate data to the second destination node.

9. The method of claim 8, wherein evaluating further includes manually receiving path modifications for distributing the portions of the intermediate data for at least one of the destination nodes which alters at least one of the dynamically selected first and second alternative paths.

10. The method of claim 7, wherein evaluating further includes receiving bandwidth limits associated with distributing the portions of the intermediate data and enforcing the bandwidth limits during the distribution of the portions of the intermediate data.

11. The method of claim 7, wherein evaluating further includes manually receiving additional conditions to satisfy in order to have the successful evaluation.

12. The method of claim 7, wherein accumulating further includes accumulating remaining portions of the data before evaluating.

* * * * *